United States Patent
Jung et al.

(10) Patent No.: US 10,367,200 B2
(45) Date of Patent: Jul. 30, 2019

(54) POSITIVE ELECTRODE ACTIVE MATERIAL SLURRY INCLUDING TWO TYPES OF BINDERS AND POSITIVE ELECTRODE PREPARED THEREFROM

(71) Applicant: LG Chem, Ltd., Seoul (KR)

(72) Inventors: Do Hwa Jung, Daejeon (KR); Hyun Won Lee, Daejeon (KR); Sang Hoon Choy, Daejeon (KR)

(73) Assignee: LG Chem, Ltd. (KR)

( * ) Notice: Subject to any disclaimer, the term of this patent is extended or adjusted under 35 U.S.C. 154(b) by 316 days.

(21) Appl. No.: 15/112,034

(22) PCT Filed: Oct. 2, 2015

(86) PCT No.: PCT/KR2015/010466
§ 371 (c)(1),
(2) Date: Jul. 15, 2016

(87) PCT Pub. No.: WO2016/053059
PCT Pub. Date: Apr. 7, 2016

(65) Prior Publication Data
US 2016/0336587 A1    Nov. 17, 2016

(30) Foreign Application Priority Data

Oct. 2, 2014  (KR) .................. 10-2014-0133019

(51) Int. Cl.
| | |
|---|---|
| *H01M 4/58* | (2010.01) |
| *H01M 4/62* | (2006.01) |
| *H01M 10/052* | (2010.01) |
| *H01M 4/136* | (2010.01) |
| *H01M 10/0525* | (2010.01) |
| *H01M 4/02* | (2006.01) |

(52) U.S. Cl.
CPC ......... *H01M 4/5825* (2013.01); *H01M 4/136* (2013.01); *H01M 4/58* (2013.01); *H01M 4/62* (2013.01); *H01M 4/623* (2013.01); *H01M 10/052* (2013.01); *H01M 10/0525* (2013.01); *H01M 2004/028* (2013.01)

(58) Field of Classification Search
CPC ...... H01M 4/5825; H01M 4/136; H01M 4/58; H01M 4/62; H01M 4/623; H01M 10/052; H01M 10/0525; H01M 2004/028
See application file for complete search history.

(56) References Cited

U.S. PATENT DOCUMENTS

| | | |
|---|---|---|
| 6,294,290 B1 | 9/2001 | Kim |
| 2004/0009397 A1 | 1/2004 | Kim et al. |
| 2006/0115730 A1* | 6/2006 | Taniguchi ............. H01M 4/131 |
| | | 429/217 |
| 2011/0014521 A1 | 1/2011 | Matsuyama et al. |
| 2011/0300452 A1 | 12/2011 | Park et al. |
| 2012/0258357 A1 | 10/2012 | Kim |
| 2014/0038035 A1 | 2/2014 | Cho et al. |
| 2015/0270072 A1* | 9/2015 | Sonobe .................. H01G 11/34 |
| | | 361/502 |
| 2015/0288040 A1* | 10/2015 | Iisaka ..................... H01M 4/96 |
| | | 429/405 |

FOREIGN PATENT DOCUMENTS

| | | |
|---|---|---|
| CA | 2585594 A1 | 10/2007 |
| EP | 2631974 A1 | 8/2013 |
| JP | 109213337 A | 8/1997 |
| JP | 2003223895 A | 8/2003 |
| JP | 2004047460 A | 2/2004 |
| JP | 2005011594 A | 1/2005 |
| JP | 2005123047 A | 5/2005 |
| JP | 2006185887 A | 7/2006 |
| JP | 2007294461 A | 11/2007 |
| JP | 2009245925 A | 10/2009 |
| JP | 2011258333 A | 12/2011 |
| KR | 19990066183 | 8/1999 |
| KR | 2003-0033595 | * 5/2003 |
| KR | 20030033595 A | 5/2003 |
| KR | 20030034427 A | 5/2003 |
| KR | 20130143151 A | 12/2013 |
| KR | 20140099715 A | 8/2014 |
| WO | 2009112920 A1 | 9/2009 |

OTHER PUBLICATIONS

European Search Report for Application No. EP15846954.4 dated Sep. 13, 2017.
International Search Report from PCT/KR2015/010466, dated Nov. 24, 2015.

* cited by examiner

*Primary Examiner* — Laura Weiner
(74) *Attorney, Agent, or Firm* — Lerner, David, Littenberg, Krumholz & Mentlik, LLP

(57) ABSTRACT

The present invention relates to positive electrode active material slurry including two different types of binders in a specific ratio and having a high solid concentration and low viscosity, a positive electrode including a positive electrode active material layer formed therefrom, and a lithium secondary battery including the positive electrode.

11 Claims, 3 Drawing Sheets

POSITIVE ELECTRODE ACTIVE MATERIAL SLURRY INCLUDING TWO TYPES OF BINDERS AND POSITIVE ELECTRODE PREPARED THEREFROM

CROSS-REFERENCE TO RELATED APPLICATION

This application is a national phase entry under 35 U.S.C. § 371 of International Application No. PCT/KR2015/010466, filed Oct. 2, 2015, which claims priority to Korean Patent Application No. 10-2014-0133019, filed Oct. 2, 2014, the disclosures of which are incorporated herein by reference.

FIELD OF THE INVENTION

The present invention relates to positive electrode active material slurry including two different types of binders in a specific ratio and having a high solid concentration and low viscosity, a positive electrode including a positive electrode active material layer formed therefrom, and a lithium secondary battery including the positive electrode.

DESCRIPTION OF THE RELATED ART

With a recent rapid development of communication industries such as various information communication including an electronics industry and mobile communication, and responding to demands for lightweight, thin, short and small electronic devices, portable electronic goods such as laptop computers, netbooks, tablet PCs, mobile phones, smart phones, PDAs, digital cameras and camcorders, and communication terminal equipment have been widely used, and accordingly, interests in the development of batteries, actuating power of these devices, are also rising.

In addition, with a development of electric vehicles such as hydrogen electric vehicles, hybrid vehicles and fuel cell vehicles, interests in the development of batteries having high performance, high capacity, high density, high output and high stability have grown greatly, and a development of batteries having a rapid charge and discharge rate property have also become a big issue.

Batteries converting chemical energy to electric energy are divided into primary batteries, secondary batteries, fuel cells, solar cells and the like depending on types and characteristics of basic component materials.

Among these, primary batteries produce energy through a non-reversible reaction as in manganese batteries, alkali batteries and mercury batteries, and, despite high capacity, have a disadvantage of recycling being impossible, and accordingly, embed various problems such as energy inefficiency and environmental contamination.

Secondary batteries include lead storage batteries, nickel-metal hydride batteries, nickel-cadmium batteries, lithium ion batteries, lithium polymer batteries, lithium metal batteries and the like, and have an advantage of recycling being possible since the secondary batteries operate by a reversible reaction as a chemical battery capable of repeating charge and discharge using reversible interconversion between chemical energy and electric energy.

Among such secondary batteries, lithium secondary batteries have been actively studied, and the lithium secondary batteries have a basic constitution of a positive electrode, a negative electrode, a separator and an electrolyte.

The positive electrode and the negative electrode are electrodes in which energy conversion such as oxidation/reduction and energy storage occurs, and each has positive and negative potential. The separator is placed between the positive electrode and the negative electrode to maintain electrical insulation, and provides a transfer passage for charges. In addition, the electrolyte performs a role of a medium in charge transfer.

Meanwhile, the positive electrode may be prepared by coating positive electrode active material slurry including a positive electrode active material on a positive electrode collector and drying the result, and herein, the positive electrode active material slurry is a mixture having liquidity obtained by adding a binder and an organic solvent to a positive electrode active material and mixing the result.

Battery performance of a lithium secondary battery such as capacity is most highly influenced by a positive electrode active material used. For enhancing battery performance, a positive electrode active material needs to be loaded in a properly high value, and also needs to be formed to a layer having a uniform and stable thickness on a collector. In order to accomplish such a goal, controlling solid content, viscosity and the like of the positive electrode active material slurry may be important.

Particularly, when using a lithium iron phosphate-based positive electrode active material, the lithium iron phosphate-based positive electrode active material has a small particle size and a wide carbon-coated specific surface, and accordingly, a solid concentration in positive electrode active material slurry including the material is low (approximately 45% of solid), and in order to accomplish the goal described above, a large quantity of an organic solvent (for example, NMP) is added to properly adjust viscosity. However, when an organic solvent is used in a large quantity, high loading is impossible since undried parts occur even after drying, and productivity declines due to an increase in a process time such as a drying time. In addition, phase stability of the slurry decreases when storing the positive electrode active material slurry, and accordingly, thickness and loading variations may occur when forming a positive electrode active material layer using the slurry, and due to the harmfulness of the organic solvent, a problem of not being environmental friendly may occur.

In view of the above, the inventors of the present invention have identified that, while studying on positive electrode active material slurry capable of reducing an organic solvent amount, a harmful substance, by increasing a solid concentration in the positive electrode active material slurry, solid content in the positive electrode active material slurry may increase by mixing a fluorine-based binder and a butadiene rubber-based binder in a specific ratio and using the result as a binder in a lithium iron phosphate-based positive electrode active material, and have completed the present invention.

DISCLOSURE OF THE INVENTION

Technical Problem

An object of the present invention is to provide positive electrode active material slurry including two different types of binders in a specific ratio, and having a high solid concentration and low viscosity.

Another object of the present invention is to provide a positive electrode including a positive electrode active material layer formed from the positive electrode active material slurry.

Still another object of the present invention is to provide a lithium secondary battery including the positive electrode, a negative electrode, and a separator provided between the positive electrode and the negative electrode.

Technical Solution

In view of the above, one aspect of the present invention provides positive electrode active material slurry including a positive electrode active material, a first binder, a second binder and an organic solvent, wherein the first binder is a fluorine-based binder, the second binder is a butadiene rubber-based binder, and the first binder and the second binder have a weight ratio of 9:1 to 7:3.

Another aspect of the present invention provides a positive electrode including a positive electrode active material layer formed from the positive electrode active material slurry.

Still another aspect of the present invention provides a lithium secondary battery including the positive electrode, a negative electrode, and a separator provided between the positive electrode and the negative electrode.

Advantageous Effects

Positive electrode active material slurry according to the present invention includes two different types of binders in a specific ratio, and therefore, high loading can be readily accomplished due to a high solid concentration and low viscosity while reducing organic solvent content, and phase stability of the positive electrode active material slurry can be excellent even when stored for a long period of time.

In addition, the slurry can be relatively environmental friendly since an amount of the highly harmful organic solvent used can be reduced, and economical advantages can be resulted due to cost reduction.

Moreover, by a positive electrode according to the present invention including a positive electrode active material layer formed from the positive electrode active material slurry, a thickness of the positive electrode active material layer is constant and loading variations can be significantly reduced, and consequently, properties of a lithium secondary battery including the positive electrode can be excellent.

DESCRIPTION OF DRAWINGS

The drawings accompanied in the present specification illustrate preferred embodiments of the present invention, and perform a role of further illuminating technological ideas of the present invention together with the contents of the invention described above, and accordingly, the present invention is not to be interpreted limiting to the descriptions in the drawings.

MODE FOR CARRYING OUT THE INVENTION

Figure 1:
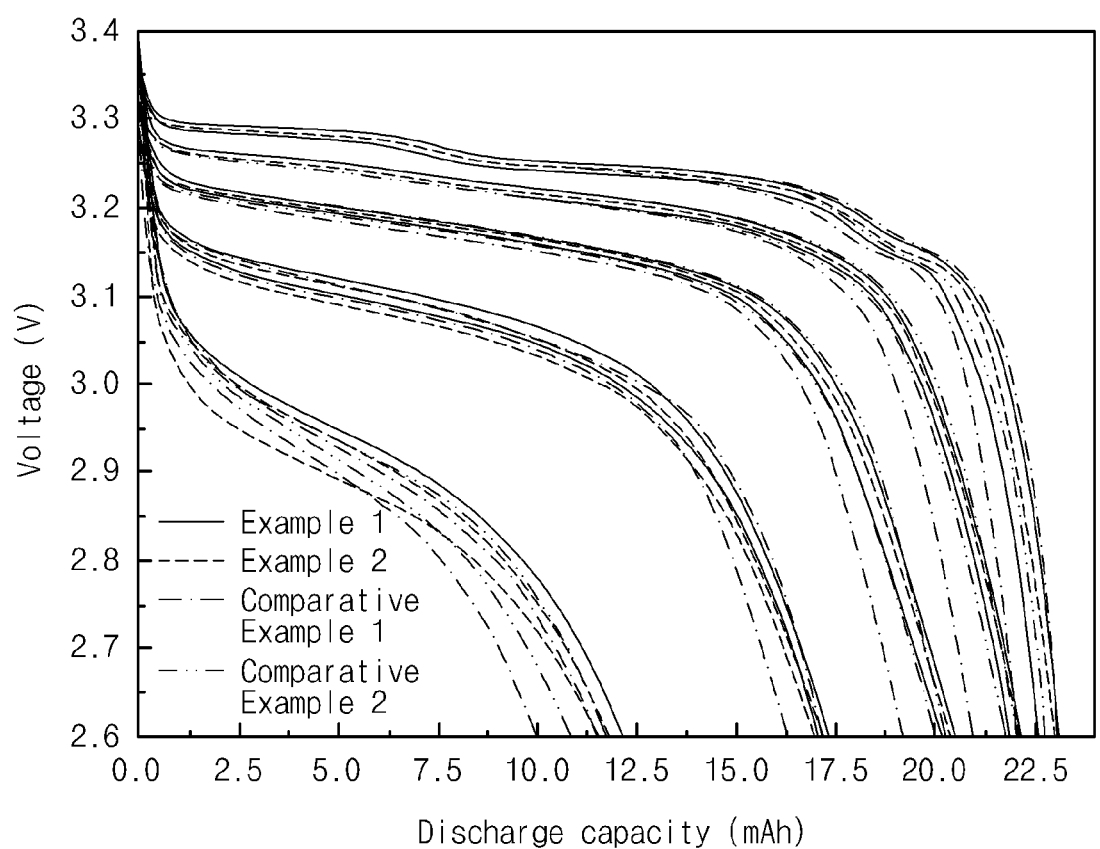
FIG. 1 is a graph showing a result of comparing and analyzing a C-rate capacity property of a lithium secondary battery according to one embodiment of the present invention.

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

The present invention provides positive electrode active material slurry having low content of an organic solvent that is a harmful substance, capable of high loading due to a high solid concentration and low viscosity, and having excellent phase stability.

The positive electrode active material slurry according to one embodiment of the present invention includes a positive electrode active material, a first binder, a second binder and an organic solvent, wherein the first binder is a fluorine-based binder, the second binder is a butadiene rubber-based binder, and the first binder and the second binder have a weight ratio of 9:1 to 7:3.

In addition, the positive electrode active material slurry according to the present invention has a solid concentration of 55% to 65%, and viscosity of 5,000 cps to 20,000 cps.

The positive electrode active material slurry according to the present invention includes two different types of binders in a specific ratio while including a lithium iron phosphate-based positive electrode active material as to be described below, and accordingly, may readily form a positive electrode active material layer since an amount of an organic solvent used may decrease, and the solid concentration and the viscosity property described above may be exhibited.

The positive electrode active material may be a lithium iron phosphate-based positive electrode active material represented by the following Chemical Formula 1:

$\text{Li}_{1+a}\text{Fe}_{1-x}\text{M}_x(\text{PO}_{4-b})\text{X}_b$ [Chemical Formula 1]

In Chemical Formula 1, M is Al, Mg, Ni, Co, Mn, Ti, Ga, V, Nb, Zr, Ce, In, Zn, Y or a combination thereof, X is F, S, N or a combination thereof, a is $-0.5 \leq a \leq 0.5$, b is $0 \leq b \leq 0.1$, and X is $0 \leq x \leq 0.5$.

Preferably, the positive electrode active material may be $\text{LiFePO}_4$, $\text{LiFeMnPO}_4$, $\text{LiFeMgPO}_4$, $\text{LiFeNiPO}_4$, $\text{LiFeAlPO}_4$ or $\text{LiFeCoNiMnPO}_4$.

The positive electrode active material may be included in 50% by weight to 65% by weight with respect to the total solid content of the positive electrode active material slurry.

Specifically, a lithium iron phosphate-based positive electrode active material generally has a small particle size and a wide carbon-coated specific surface area, therefore, a solid concentration of including positive electrode active material slurry including the material is low, and consequently, a large quantity of an organic solvent is added to adjust viscosity to a level suitable to form a positive electrode active material layer. Accordingly, content of a positive electrode active material is relatively low and content of an organic solvent is high in positive electrode active material slurry, and as a result, high loading is impossible since undried parts occur when high loading, productivity declines due to an increase in drying process time, and thickness and loading variations may occur in a positive electrode active material layer formed from the positive electrode active material slurry due to a phase stability decrease of the slurry. A first binder and a second binder are mixed and used in the positive electrode active material slurry according to the present invention as described above, which lowers viscosity by increasing a total solid concentration in the positive electrode active material slurry, and may reduce an amount of an organic solvent used, which is a harmful substance, while relatively increasing positive electrode active material content (based on solid) compared to existing positive electrode active material slurry, and consequently, problems such as above may be solved.

The first binder performs a role of increasing adhesive strength between a positive electrode active material layer and a positive electrode active material layer in positive electrode active material slurry; and between a positive electrode active material layer and a positive electrode collector, and may be a fluorine-based binder. Specifically, the first binder may be one or more types selected from the group consisting of polyvinylidene fluoride (PVDF), a vinylidene fluoride-hexafluoropropylene copolymer (PVDF-co-HEP), chlorotrifluoroethylene (CFTF) and polytetrafluoroethylene (PTFE). Preferably, the first binder may be polyvinylidene fluoride.

The second binder performs a role of a dispersion agent in positive electrode active material slurry, and may be included in 20 parts by weight to 30 parts by weight with respect to 100 parts by weight of the whole positive electrode active material slurry. The second binder may be a butadiene rubber-based binder, and specifically, the second binder may be styrene-butadiene rubber, nitrile-butadiene rubber or a combination thereof.

In addition, the first binder and the second binder according to the present invention may be included in a weight ratio of 9:1 to 7:3 in the positive electrode active material slurry as described above, and may preferably have a weight ratio of 8:2 to 7:2. When a weight ratio of the first binder and the second binder is outside 9:1 and a ratio of the first binder further increases, a degree of a solid concentration increase in the positive electrode active material slurry including the first binder and the second binder is insignificant, and an effect from a solid concentration increase may not be obtained. Meanwhile, when a weight ratio of the first binder and the second binder is outside 7:3 and a ratio of the first binder further decreases, viscosity of the positive electrode active material slurry including the first binder and the second binder becomes excessively low, and when the positive electrode active material slurry is coated on a positive electrode collector, the coating may become unstable.

The organic solvent may be N-methylpyrrolidone (NMP), N,N-dimethylacetamide (DMAc) or a combination thereof.

Meanwhile, the positive electrode active material slurry according to the present invention may further include a conductor.

Herein, the conductor is not particularly limited as long as it has conductivity without inducing a side reaction with other components of the corresponding battery, and examples thereof may include graphite such as natural graphite or artificial graphite; carbon black such as carbon black (super-p), acetylene black, Ketjen black, channel black, furnace black, lamp black or thermal black; conductive fiber such as carbon fiber or metal fiber; metal powder such as fluorocarbon, aluminum or nickel powder, conductive whiskers such as zinc oxide or potassium titanate; conductive metal oxides such as titanium oxide; conductive materials such as polyphenylene derivatives, and the like. The conductor may be used in 0.05% by weight to 5% by weight with respect to the total weight of the positive electrode active material, however, the amount is not limited thereto.

In addition, the positive electrode active material slurry according to the present invention may, as necessary, additionally include additives such as a filler in addition to the active components described above (positive electrode active material, first binder, second binder and organic solvent).

The filler is a component suppressing expansion of a positive electrode, which may be used as necessary, and is not particularly limited as long as it is a fibrous material that does not induce chemical changes in the corresponding battery, and examples thereof may include olefin-based polymers such as polyethylene or polypropylene; or a fibrous material such as glass fiber or carbon fiber.

In addition, the present invention provides a positive electrode including a positive electrode active material layer formed from the positive electrode active material slurry.

The positive electrode active material layer included in the positive electrode according to one embodiment of the present invention is formed from the positive electrode active material slurry, and consequently, the positive electrode active material layer may have a constant thickness, and variations in the loading amount of the positive electrode active material may be significantly low on the overall positive electrode.

The positive electrode according to the present invention may be prepared by coating the positive electrode active material slurry on at least one surface of a positive electrode collector, and drying the result.

The positive electrode collector may generally use those having a thickness of 3 μm to 500 μm, and is not particularly limited as long as it has high conductivity without inducing chemical changes in the corresponding battery. For example, stainless steel, aluminum, nickel, titanium, baked carbon, or aluminum or stainless steel of which surface is treated with carbon, nickel, titanium, silver or the like, may be used.

The coating is not particularly limited, and may be carried out using methods commonly known in the art, and for example, may be carried out by spraying or distributing the positive electrode active material slurry on at least one surface of the positive electrode collector, and then uniformly dispersing the slurry using a doctor blade and the like. In addition to this method, methods such as die casting, comma coating and screen printing may be used.

The drying is not particularly limited, but may be carried out by heat treatment within one day in a vacuum oven at 50° C. to 200° C. Herein, the heat treatment may both include direct heating and indirect heating such as hot-air drying.

Moreover, the present invention provides a lithium secondary battery including the positive electrode.

The lithium secondary battery according to one embodiment of the present invention includes the positive electrode, a negative electrode, a separator provided between the positive electrode and the negative electrode, and an electrolyte.

The negative electrode may be prepared by coating negative electrode active material slurry on at least one surface of a negative electrode collector, and drying the result, and herein, the negative electrode active material slurry may further include additives such as a binder, a conductor and a filler in addition to the negative electrode active material.

The negative electrode active material is not particularly limited, and carbon materials capable of lithium ion intercalation and deintercalation, lithium metal, silicon, tin or the like commonly known in the art may be used. Carbon materials are preferably used, and both low crystalline carbon and high crystalline carbon may be used as the carbon material. Low crystalline carbon may include soft carbon and hard carbon, and high crystalline carbon may include natural graphite, Kish graphite, pyrolytic carbon, mesophase pitch based carbon fiber, meso-carbon microbeads, mesophase pitches and high-temperature baked carbon such as petroleum or coal tar pitch derived cokes.

The negative electrode collector may be the same as or included in the positive electrode collector described above, the conductor and the filler may be the same as those described above, and an organic solvent may be used as necessary. Herein, the organic solvent may be the same as the organic solvent described above.

The binder may be one or more types selected from the group consisting of a vinylidene fluoride-hexafluoropropylene copolymer (PVDF-co-HEP), polyvinylidene fluoride (PVDF), chlorotrifluoroethylene (CTFE), polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR) and fluorine rubber.

The coating and the drying may be the same as those described above.

The separator may be an insulating thin film having high ion permeability and mechanical strength, and may generally have a pore diameter of 0.01 µm to 10 µm and a thickness of 5 µm to 300 µm. As such a separator, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber, polyethylene terephthalate fiber or the like may be used, however, the separator is not limited thereto.

In addition, the electrolyte is not particularly limited, and may include an organic solvent and a lithium salt commonly used in an electrolyte.

An anion of the lithium salt may be one or more types selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

Typical examples of the organic solvent may include one or more types selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite and tetrahydrofuran.

Particularly, ethylene carbonate and propylene carbonate, which are cyclic carbonates, may be preferably used among the carbonate-based organic solvents, since they have a high dielectric constant as highly viscous organic solvents, and readily dissociate a lithium salt in an electrolyte, and when such a cyclic carbonate and a linear carbonate having low viscosity and a low dielectric constant such as dimethyl carbonate and diethyl carbonate are mixed in a proper ratio and used, an electrolyte liquid having high electric conductivity is capable of being prepared, which is more preferable.

In addition, for improving a charge and discharge property, a flame retarding property and the like, the electrolyte may further include, as necessary, pyridine, triethyl phosphite, triethanolamine, cyclic ether, ethylene diamine, n-glyme, hexaphosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like. In some cases, a halogen-containing solvent such as carbon tetrachloride or ethylene trifluoride may be further added for providing nonflammability, and carbon dioxide gas may be further included for enhancing a high temperature storage property, and fluoro-ethylene carbonate (FEC), propene sultone (PRS), fluoro-propylene carbonate (FPC) and the like may be further included.

The lithium secondary battery of the present invention may be manufactured by forming an electron assembly by disposing a separator between a positive electrode and a negative electrode, placing the electrode assembly inside a cylinder-type battery case or a square-type battery case, and then injecting an electrolyte into the case. Alternatively, the lithium secondary battery of the present invention may also be manufactured by laminating the electrode assembly, immersing the electrode assembly into an electrolyte, and placing the obtained result in a battery case and sealing the result.

As the battery case used in the present invention, those commonly used in the art may be selected, and an appearance of the lithium secondary battery is not limited by the use, and a cylinder-type, a square-type, a pouch-type or a coin-type using a can, or the like may be included.

The lithium secondary battery according to the present invention may be used in a battery cell used as a power supply of small devices, but may also be preferably used as a unit battery in a medium to large sized battery module including a plurality of battery cells. Preferred examples of the medium to large sized device may include electric vehicles, hybrid electric vehicles, plug-in hybrid electric vehicles, systems for power storage and the like, but are not limited thereto.

Hereinafter, the present invention will be described in more detail with reference to the following examples and test examples. However, the following examples and test examples are for illustrative examples only, and the scope of the present invention is not limited thereto.

Example 1

1) Preparation of Positive Electrode Active Material Slurry

Positive electrode active material slurry was prepared by adding polyvinylidene fluoride, styrene-butadiene rubber, denka black and NMP to $LiFePO_4$, and mixing the result. Herein, the polyvinylidene fluoride and the styrene-butadiene rubber were used in a weight ratio of 8:2. The prepared positive electrode active material slurry had a solid concentration of 64% and viscosity of 19,500 cps.

2) Manufacture of Lithium Secondary Battery

The prepared positive electrode active material slurry was applied on an aluminum thin film having a thickness of 20 µm, and the result was vacuum dried for 12 hours at 130° C. to prepare a positive electrode active material layer-formed positive electrode.

Negative electrode active material slurry was prepared by mixing 1% by weight of a carbon black-based conductor, 1.5% by weight of carboxymethylcellulose (CMC) and 1.5% by weight of styrene-butadiene rubber (SBR) to 96% by weight of natural graphite, and a negative electrode was prepared by applying the slurry on copper foil to a thickness of 150 μm, and roll pressing and drying the result.

The positive electrode and the negative electrode prepared in Example 1-1) were stamped to a size of 3×4 cm², and a carbonate-based electrolyte liquid in which 1 M $LiPF_6$ and 2% by weight of vinyl chloride (VC) were dissolved was injected thereto to manufacture a polymer cell-type monocell for tests.

Example 2

A monocell for tests was manufactured in the same manner as in Example 1 except that the polyvinylidene fluoride and the styrene-butadiene rubber were used in a weight ratio of 7:3 when preparing the positive electrode active material slurry. Meanwhile, the prepared positive electrode active material slurry had a solid concentration of 64% and viscosity of 15,000 cps.

Comparative Example 1

A monocell for tests was manufactured in the same manner as in Example 1 except that only the polyvinylidene fluoride was used without using the styrene-butadiene rubber, and twice the amount of the NMP was used when preparing the positive electrode active material slurry. Meanwhile, the prepared positive electrode active material slurry had a solid concentration of 46% and viscosity of 20,000 cps.

Comparative Example 2

A monocell for tests was manufactured in the same manner as in Example 1 except that the polyvinylidene fluoride and the styrene-butadiene rubber were used in a weight ratio 9.5:0.5 when preparing the positive electrode active material slurry. Meanwhile, the prepared positive electrode active material slurry had a solid concentration of 46% and viscosity of 18,000 cps.

Test Example 1

In order to compare and analyze the solid concentration and the viscosity of each positive electrode active material slurry in Examples 1 and 2 and Comparative Examples 1 and 2, each solid concentration and viscosity were measured.

The solid concentration was measured through a method of drying the each positive electrode active material slurry until the solid was saturated up to 0.01% at 150° C. using a solid measuring device, and the viscosity was measured at room temperature using a number 4 pin of a Brooks viscometer. The results are shown in the following Table 1.

TABLE 1

| Category | Solid Concentration (%) | Viscosity (cps) |
| --- | --- | --- |
| Example 1 | 64 | 19,500 |
| Example 2 | 64 | 15,000 |
| Comparative Example 1 | 46 | 20,000 |
| Comparative Example 2 | 46 | 18,000 |

As shown in Table 1, despite a small quantity of the organic solvent (NMP) used, the positive electrode active material slurry of Example 1 and Example 2 mixing and using two types of binders according to the present invention exhibited a relatively high solid concentration and low viscosity compared to the positive electrode active material slurry of Comparative Example 1 using a large quantity of the organic solvent (NMP).

In addition, the positive electrode active material slurry of Comparative Example 2 mixing and using two types of binders, but in a ratio outside the proper mixing ratio of the two types of binders according to the present invention exhibited a rather low viscosity value, but did not have a favorable solid concentration.

Accordingly, the positive electrode active material slurry including two types of binders according to present invention is capable of exhibiting an excellent solid concentration property and an excellent viscosity property with a small quantity of a harmful organic solvent, and as a result, a cost-saving effect and an environmentally friendly effect may be obtained due to a decrease in the use of an organic solvent.

Test Example 2

A capacity property of each monocell manufactured in Examples 1 and 2 and Comparative Examples 1 and 2 was compared and analyzed. The results are shown in FIG. 1.

For each of the batteries, a rate property was identified at a rate of 0.2 C, 0.5 C, 1.0 C, 1.5 C and 2.0 C at 25° C., and a C-rate measuring standard was calculated based on 1 C. Charge was carried out at a rate of 0.5 C with CC/CV, and discharge was carried out to 2.5 V each at a rate of 0.2 C, 0.5 C, 1.0 C, 1.5 C, 2.0 C with CC, and a capacity property was analyzed by measuring discharge capacity.

As shown in FIG. 1, it was identified that the monocells of Example 1 and Example 2 including the positive electrode active material slurry according to the present invention were capable of exhibiting a similar capacity property compared to Comparative Example 1 and Comparative Example 2.

Accordingly, this indicates that, by the positive electrode active material slurry of Examples 1 and 2 according to the present invention mixing and using two types of binders, phase stability of the positive electrode active material slurry may be excellent despite the use of an organic solvent in a small quantity, and consequently, the monocell using a positive electrode prepared using the same has an effect of exhibiting similar efficiency compared to the monocell of Comparative Example 1 using existing positive electrode active material slurry.

Test Example 3

A lifespan property of each lithium secondary battery manufactured in Examples 1 and 2 and Comparative Example 1 was compared and analyzed. The results are shown in FIG. 2.

For each of the batteries, charge and discharge were repeated for 250 times under a 0.5 C charge and 0.5 C discharge condition at 25° C., and capacity decline depending on the number of repetition was measured.

Figure 2:
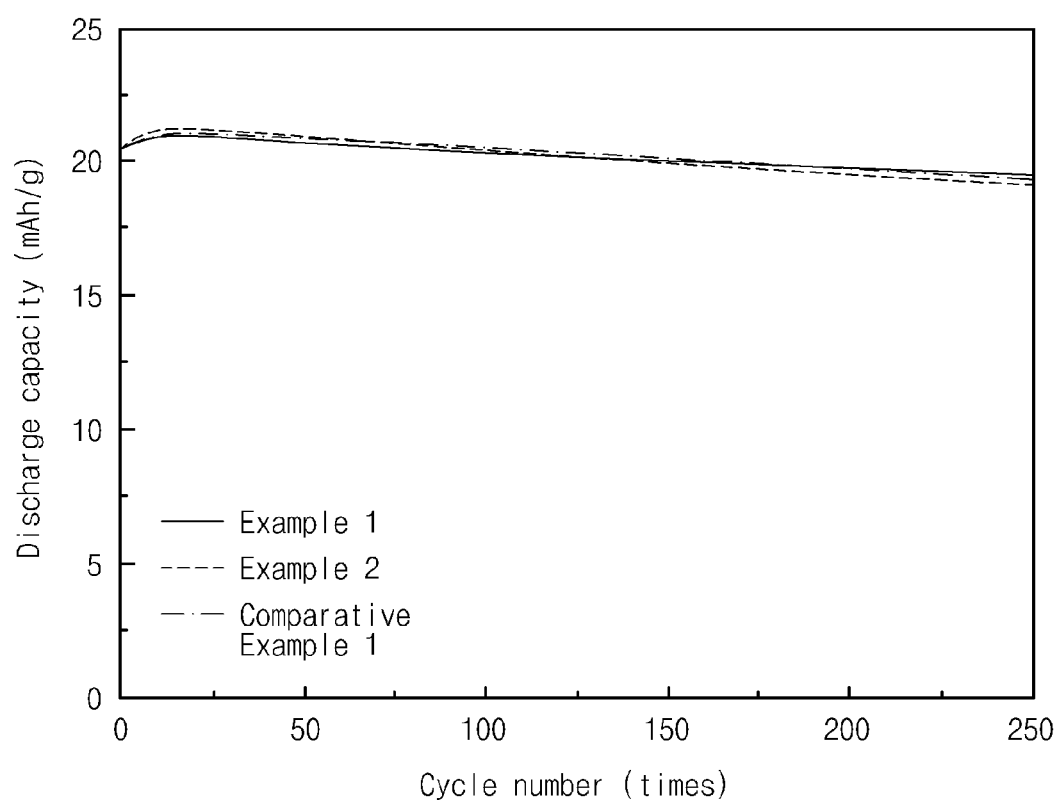
FIG. 2 is a graph showing a result of comparing and analyzing a lifespan property of a lithium secondary battery according to one embodiment of the present invention.

As shown in FIG. 2, it was identified that the monocells of Example 1 and Example 2 including the positive electrode active material slurry according to the present invention were capable of exhibiting a similar lifespan property compared to Comparative Example 1.

Accordingly, this indicates that, by the positive electrode active material slurry of Examples 1 and 2 according to the present invention mixing and using two types of binders, phase stability of the positive electrode active material slurry may be excellent despite the use of an organic solvent in a small quantity, and consequently, the monocell using a positive electrode prepared using the same has an effect of exhibiting similar efficiency compared to the monocell of Comparative Example 1 using existing positive electrode active material slurry.

Test Example 4

A sheet resistance property of each lithium secondary battery manufactured in Examples 1 and 2 and Comparative Examples 1 and 2 was compared and analyzed. The results are shown in FIG. 3.

Sheet resistance of the electrode was measured using a 4-probe measuring device at room temperature by stamping each of the positive electrodes into 5 cm×5 cm.

Figure 3:
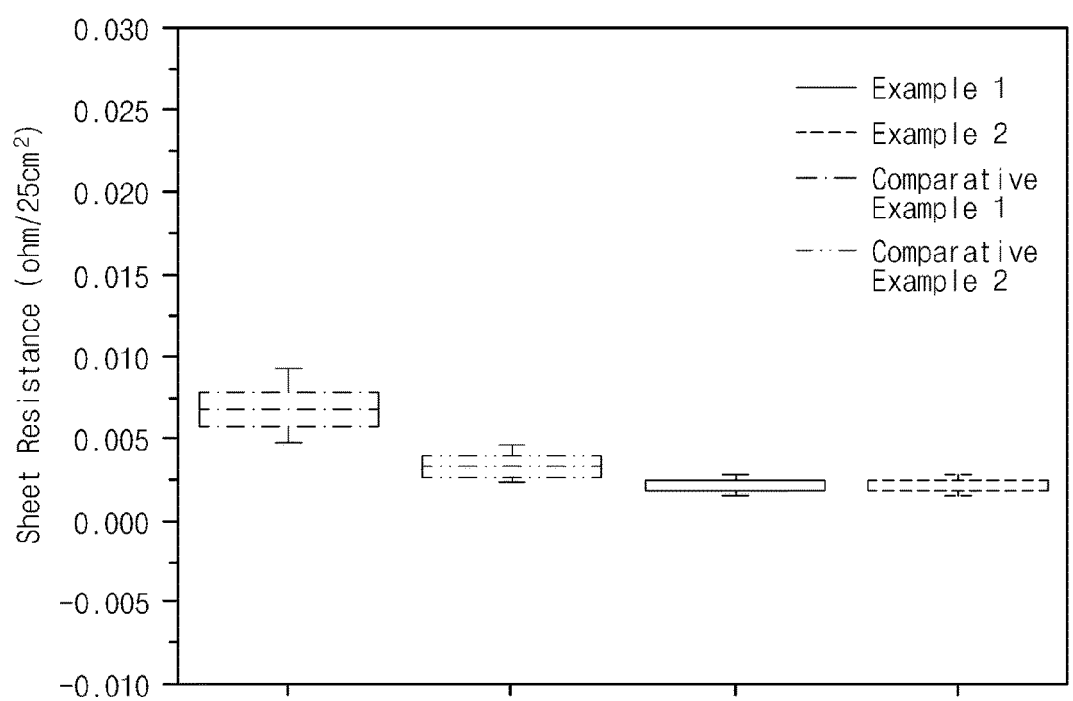
FIG. 3 is a graph showing a result of comparing and analyzing an electrode sheet resistance property of a lithium secondary battery according to one embodiment of the present invention.

As shown in FIG. 3, it was identified that the monocells of Example 1 and Example 2 including the positive electrode active material slurry according to the present invention were capable of exhibiting a rather excellent sheet resistance property compared to Comparative Example 1 and Comparative Example 2.

Accordingly, by the positive electrode active material slurry of Examples 1 and 2 according to the present invention mixing and using two types of binders, phase stability of the positive electrode active material slurry may be excellent and a positive electrode active material layer having minimized loading and thickness variations may be formed despite the use of an organic solvent in a small quantity, which means that the monocell using the same is capable of exhibiting a more excellent sheet resistance property compared to the monocell of Comparative Example 1 using existing positive electrode active material slurry.

In addition, this means that, in the mixing ratio of two types of binders, a more superior effect is capable of being obtained when the ratio is controlled to a ratio within the range according to the present invention.

What is claimed is:

1. A positive electrode active material slurry comprising:
a positive electrode active material;
a first binder;
a second binder; and
an organic solvent,
wherein the first binder is a fluorine-based binder,
the second binder is a butadiene rubber-based binder, and
the first binder and the second binder have a weight ratio of 9:1 to 7:3,
wherein the positive electrode active material is included in 50% by weight to 65% by weight with respect to total solid content of the positive electrode active material slurry,
wherein the positive electrode active material is a lithium iron phosphate-based positive electrode active material represented by the following Chemical Formula 1:

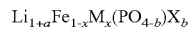   [Chemical Formula 1]

wherein, in Chemical Formula 1,
M is Al, Mg, Ni, Co, Mn, Ti, Ga, V, Nb, Zr, Ce, In, Zn, Y or a combination thereof,
X is F, S, N or a combination thereof,
a is $-0.5 \leq a \leq 0.5$,
b is $0 \leq b \leq 0.1$, and
x is $0 \leq x \leq 0.5$.

2. The positive electrode active material slurry of claim 1, wherein the positive electrode active material is $LiFePO_4$, $LiFeMnPO_4$, $LiFeMgPO_4$, $LiFeNiPO_4$, $LiFeAlPO_4$ or $LiFeCoNiMnPO_4$.

3. The positive electrode active material slurry of claim 1, wherein the first binder is one or more types selected from the group consisting of polyvinylidene fluoride (PVDF), a vinylidene fluoride-hexafluoropropylene copolymer (PVDF-co-HEP), chlorotrifluoroethylene (CFTF) and polytetrafluoroethylene (PTFE).

4. The positive electrode active material slurry of claim 1, wherein the second binder is one or more types selected from the group consisting of styrene-butadiene rubber and nitrile-butadiene rubber.

5. The positive electrode active material slurry of claim 1, wherein the second binder is included in 20 parts by weight to 30 parts by weight with respect to 100 parts by weight of the whole positive electrode active material slurry.

6. The positive electrode active material slurry of claim 1, further comprising a conductor.

7. The positive electrode active material slurry of claim 1, wherein the organic solvent is one or more types selected from the group consisting of N-methylpyrrolidone (NMP) and N,N-dimethylacetamide (DMAc).

8. The positive electrode active material slurry of claim 1, which has a solid concentration of 55% to 65%.

9. The positive electrode active material slurry of claim 1, which has viscosity of 5,000 cps to 20,000 cps.

10. A positive electrode comprising a positive electrode active material layer formed from the positive electrode active material slurry of claim 1.

11. A lithium secondary battery comprising:
the positive electrode of claim 10;
a negative electrode; and
a separator provided between the positive electrode and the negative electrode.

* * * * *